United States Patent [19]

Zogg et al.

[11] Patent Number: 5,213,885
[45] Date of Patent: May 25, 1993

[54] METHOD AND APPARATUS FOR PRODUCING A COMPRESSIBLE ZONE IN AT LEAST ONE PERIPHERAL REGION OF A MINERAL FIBER SHEET OR BATT FOR INSULATION AGAINST HEAT, SOUND AND/OR FIRE, AND MINERAL FIBER SHEETS PRODUCED BY THE METHOD

[75] Inventors: Hans Zogg, Trubbach; Peter Wyss, Sargans, both of Switzerland

[73] Assignee: Flumroc AG, Flums, Switzerland

[21] Appl. No.: 656,139

[22] PCT Filed: Jul. 12, 1990

[86] PCT No.: PCT/CH90/00169
§ 371 Date: Mar. 4, 1991
§ 102(e) Date: Mar. 4, 1991

[87] PCT Pub. No.: WO91/02128
PCT Pub. Date: Feb. 21, 1991

[30] Foreign Application Priority Data

Jul. 31, 1989 [CH] Switzerland .................. 2846/89

[51] Int. Cl.⁵ ................................ B29C 67/00
[52] U.S. Cl. ................................ 428/280; 264/119; 264/280; 425/83.1; 425/383; 428/192; 428/224; 428/288; 428/920
[58] Field of Search ........... 264/119, 280, 296, 297.4, 264/324; 425/80.1, 83.1, 383, 403.1; 428/224, 288, 920, 192, 280

[56] References Cited

U.S. PATENT DOCUMENTS 3,187,386  6/1965  Schubert .................. 425/83.1
4,483,904  11/1984  Church .................... 428/543

FOREIGN PATENT DOCUMENTS 3203622  4/1983  Fed. Rep. of Germany.
2162791  2/1986  United Kingdom.

Primary Examiner—Mary Lynn Theisen
Attorney, Agent, or Firm—Frishauf, Holtz, Goodman & Woodward

[57] ABSTRACT

For fulling, the mineral fiber sheets (11) are moved in the direction of the arrow by means of two endless studded belts, only the lower one (15) of which is visible in the drawing. By means of the first fulling tool (29), pre-fulling to a depth of about 8 cm is effected. With the second fulling tool (30), fulling to a depth of about 11 cm is effected. During the fulling process, the region of the mineral fiber sheet (11) not belonging to the fulling zone is supported on the bottom and top, so that a change in the fibrous structure of the material takes place only in the peripheral region that subsequently forms a compressible zone (23). The fulling is done from the side, or in other words in the same direction as the later compression upon installation of the mineral fiber sheet between two rafters. To prevent sagging of the mineral fiber sheet (11) during the fulling process, guides, only the lower guide (27) of which is visible, are disposed in the region of the fulling zone above and below the mineral fiber sheet. Each fulling tool (29, 30) comprises a plunger (32) with a cylindrically curved surface (31), over which an endless belt (37) is guided. The belt travels at practically twice the speed of the mineral fiber sheet (11). During the passage of the mineral fiber sheet (11), the plunger (32), driven by the crank drive mechanism (43), executes a number of pivoting motions about the pivot shaft (41).

23 Claims, 2 Drawing Sheets

METHOD AND APPARATUS FOR PRODUCING A COMPRESSIBLE ZONE IN AT LEAST ONE PERIPHERAL REGION OF A MINERAL FIBER SHEET OR BATT FOR INSULATION AGAINST HEAT, SOUND AND/OR FIRE, AND MINERAL FIBER SHEETS PRODUCED BY THE METHOD

FIELD OF THE INVENTION

The invention relates to a method for producing a compressible zone in at least one peripheral region of a mineral fiber sheet or batt for insulation against heat, sound and/or fire, in which the individual fibers are combined with a binder to make a fibrous composite structure, in which method the fibrous composite structure is partly disintegrated by mechanical action in a fulling zone, for forming the compressible zone.

BACKGROUND

It is conventional in the art to produce mineral fiber sheets and batts by gluing together a stack of mineral fibers into a sheet by using binders, such as phenolic resin. A mineral fiber sheet produced by such a technique is relatively stiff. If it is to be fitted in between rafters spaced apart by variable distances, this cannot be done by simply compressing the sheets, at least not if the differences in spacing, as is usually the case, amount to more than 1 to 2 cm. In that case, the mineral fiber sheets must be cut to size, accordingly, which requires a considerable expenditure of time and labor and wastes material. Another disadvantage that a relatively large amount of mineral dust is produced when the mineral fiber sheets are cut to size. It has therefore already been proposed, in German Patent Document A 32 03 622, Conrad et al, to work the peripheral regions of the mineral fiber sheet or batt in such a way that the fibrous composite structure is at least partly disintegrated. This is intended to create a compressible zone that makes it possible to fit the mineral fiber sheet between rafters even when the rafters are spaced apart from one another by up to about 5 cm less than the width of the mineral fiber sheet. For working the peripheral region, the use of pressure rollers located in pairs at an acute angle to the center plane of the mineral fiber sheet or batt, so that they enclose the peripheral region between them, is proposed. However, the method has not proved successful and therefore never gained commercial acceptance. One disadvantage of the method is that it does not enable uniform separation of the fibrous composite structure. In the manufacture of a mineral fiber sheet or batt, certain nonuniformities must always be expected, which then become problematic during fulling. In the resultant product, the fulled zone is variably compressible. Such variations in compressibility can be a considerable hindrance to installing the sheet or batt, or can even make it impossible. Insulating sheets prepared in the manner described have a tendency to buckle laterally outward in the deformed region and then to fall out between the rafters again during or after installation.

The Conrad et al German Patent Document A 32 03 622 also proposes, in passing, replacing the pressure rollers with one or more press plates, which are connected to a drive mechanism to generate a reciprocating motion or a pivoting motion. If the fulling is done with a press plate acting laterally upon the mineral fiber batt, then the mineral fiber batt is compressed over its entire width. This has the disadvantage that the fibrous composite structure is loosened over the entire width. This loosening is relatively slight, so that a strong force is necessary to install the plate between the rafters. On the other hand, the loosening of the fibrous composite structure over its entire width also has the effect that upon being installed, the mineral fiber sheet has a tendency to sag. It is accordingly unsurprising that the known method has not found any practical application.

THE INVENTION

It is therefore the object of the present invention to create an improved method for producing the mineral fiber sheets or batts of the type described.

Briefly, according to the invention, a zone is formed, the mineral fiber sheet or batt is supported on the bottom and top in the region not belonging to this zone, and the peripheral region is fulled from the side. Because the mineral fiber sheet or batt is supported at the top and bottom outside the peripheral zone needed for forming the compressible zone, the fibrous composite structure is partly separated, or loosened, or broken up only in this peripheral region, but not outside it. It has now been unexpectedly found that mineral fiber sheets or batts produced in this way have a compressible zone with substantially better properties than the mineral fiber sheets or batts produced by the known method. The mineral fiber sheets or batts produced by the method according to the invention can be readily installed and the danger that the sheet will sag and fall out is practically nonexistent.

It has proved to be practical for the mineral fiber sheet or batt, during fulling, to be compressed in thickness by about 10% of this thickness vertically to the plane of the sheet, in the region not belonging to the fulling zone. As a result, the mineral fiber sheet is securely retained during the fulling process, breakup, or loosening, or even and disintegration of the fibrous composite structure in the region outside the fulling zone is reliably avoided. After this compression, the mineral fiber sheet returns elastically to its original thickness. The formation of the compressible zone preferably takes place in a plurality of steps, for example in two steps. In this way, a progressively decreasing disintegration of the fibrous composite structure from the outside in is attained. Accordingly, the compressible zone is softer near the edge of the sheet than father away from it. This contributes substantially to prevention of buckling or sagging of the mineral fiber sheet upon installation.

In the fulling, sagging of the material in the peripheral zone out of the plane of the sheet or batt can be avoided by means of guides that are disposed in the region of the peripheral zone to be worked, above and below the mineral fiber sheet or batt. This contributes considerably to the uniformity of the compressible zone, so that later, upon installation of the mineral fiber sheet or batt between the rafters, sagging is reliably prevented. The fulling is suitably effected by the repeated back-and-forth motion of a fulling tool during the passage of the mineral fiber sheet or batt. The desired degree of compressibility of the compressible zone of the installation sheet can be adjusted by the selection of the fulling depth and by the number of back-and-forth motions or strokes of the fulling tool. The compressibility is advantageously selected such that upon installation of the mineral fiber sheet between the rafters, a force of approximately 18 to 25 kg per running meter is necessary. However, special customer-specific needs can be addressed by simply increasing or reducing the number of strokes.

It has proved to be advantageous for fulling to be done with approximately 20% more strokes in the first step than in the second step. It has proved advantageous to perform the fulling with a total of 40 to 45 strokes per running meter. The material in the peripheral zone is thus exposed to repeated compression and decompression, which effects the desired loosening of the fibrous composite structure. Suitably, in the first step fulling is performed to a depth of approximately 8 cm, and then in the second step fulling is performed to a depth of approximately 11 cm. In this way, a relatively wide compressible zone can be attained, which upon installation allows a compression of around 5 cm. In other words, a sheet 56 cm wide, for instance, can be used for installation between rafters that are spaced apart by 55 to 50 cm.

In accordance with a feature of the invention, a fulling apparatus for performing the method is provided which has at least one fulling tool and means for generating a relative motion between the mineral fiber sheet or batt and the fulling tool. According to the invention, the mineral fiber sheet or batt is supported at the top and bottom in the region not belonging to the fulling zone, and the fulling tool is so formed that it executes back- and forth motions and thereby fulls the peripheral region of the mineral fiber sheet or batt from the side. This apparatus is relatively simple in structure and is highly suitable for performing the method of the invention. Suitably, two fulling tools are provided, with a first fulling tool serving to perform pre-fulling, and a second fulling tool serving to perform fulling over the entire depth. The pre-fulling is done to a depth of approximately 8 cm, and the second fulling to a depth of approximately 11 cm. In this way, a compressible zone is produced that is less and less easily compressible progressively from the outside in. The danger of sagging of the mineral fiber sheet or batt upon installation between the rafters is thereby avoided.

A guide is suitably disposed above and below the fulling zone, to avoid sagging of the material during fulling. This contributes to the formation of an ideal compressible zone.

Each guide may have a bead on the inside that extends along the edge adjacent to the support means. However, it would also be possible to bend the guide inward somewhat along its length. The bead or the bent portion provides a constriction that prevents material from being pressed against the edge of the endless belt during the fulling and prevents the surface of the mineral fiber sheet from becoming damaged in this region. The support of the region of the mineral fiber sheet or batt not belonging to the fulling zone can be done in various ways. Endless studded belts moving with or advancing the mineral fiber sheet or batt have proved to be highly advantageous. This has the advantage that the studs of the studded belts penetrate the surface of the mineral fiber sheet somewhat and prevent compression of the mineral fiber sheet or batt in the supported region. As a result, during fulling, the partial disintegration of the fibrous composite structure is limited to the region of the crumple zone. A suitable embodiment of the invention provides that the fulling tool has a plunger that has a cylindrically curved surface. This makes for gentle fulling. Suitably, the plunger is provided with an endless belt that extends over the cylindrically curved surface and is moved at practically twice the speed of the mineral fiber sheet or batt and in the same direction as the mineral fiber sheet or batt. Tests have shown that when the endless belt travels at double speed, the mineral fiber sheet or batt is not impacted backwards. These provisions thus contribute to gentle handling of the material.

The plunger advantageously has a deflection roller for the endless belt on each end of the curved surface. At least one of these rollers can serve to drive the belt. This makes for as relatively simple construction of the fulling tool.

In the vicinity of a deflection roller, the plunger suitably has a pivot shaft about which it can be pivoted; a crank drive mechanism may be disposed spaced apart from the pivot point, for pivoting the plunger back and forth. This construction has proved advantageous for the sake of gentle handling of the mineral fiber sheets or batts to be worked.

The invention also relates to a mineral fiber sheet or batt having at least one compressible zone, produced by the method according to the invention. This mineral fiber sheet or batt may also have a compressible zone on more than one side, and in particular on two sides opposite one another. However, it has proved to be suitable and favorable in terms of cost to prove a compressible zone on only one side. Mineral fiber sheets or batts of this type are suitable for installation with variable rafter spacings. They stay in place on their own, without hindering ventilation from behind. As a rule, cutting to size is unnecessary. Suitably, mineral fiber sheets or batts of various widths are furnished. A width of 51 cm is suitable for installation with a rafter spacing of from 46 to 50 cm; a width of 56 cm is suitable for installation with a rafter spacing of 51 to 55 cm; and so forth.

It is highly advantageous that the mineral fiber sheet or batt adapts to the shrinkage or shifting that occurs in wood construction. This is especially significant because by now, virtually nothing but green wood is used for roof constructions.

Since cutting to size is unnecessary, practically no dust is produced in on-site processing. The mineral fiber sheet or batt according to the invention is thus easier on the skin that known products of this type. Measurements have shown that dust production is approximately 5 times less than that produced in handling previously known products, which must be cut to size.

The mineral fiber sheet advantageously has a compressible zone such that to install the sheet, a force of approximately 18 to 24 kg per running meter is needed. This allows problem-free installation and also assures sufficient holding force for the installed mineral fiber sheet.

DRAWINGS

Exemplary embodiments of the invention will now be described.

Shown are:

FIG. 1, a schematic top view illustration of a two-stage fulling apparatus;

FIG. 2, a section along the line II—II of FIG. 1; and

FIG. 3, a section as in FIG. 2 of a fulling apparatus which works a plurality of mineral fiber sheets or batts simultaneously.

DETAILED DESCRIPTION

Figure 1:
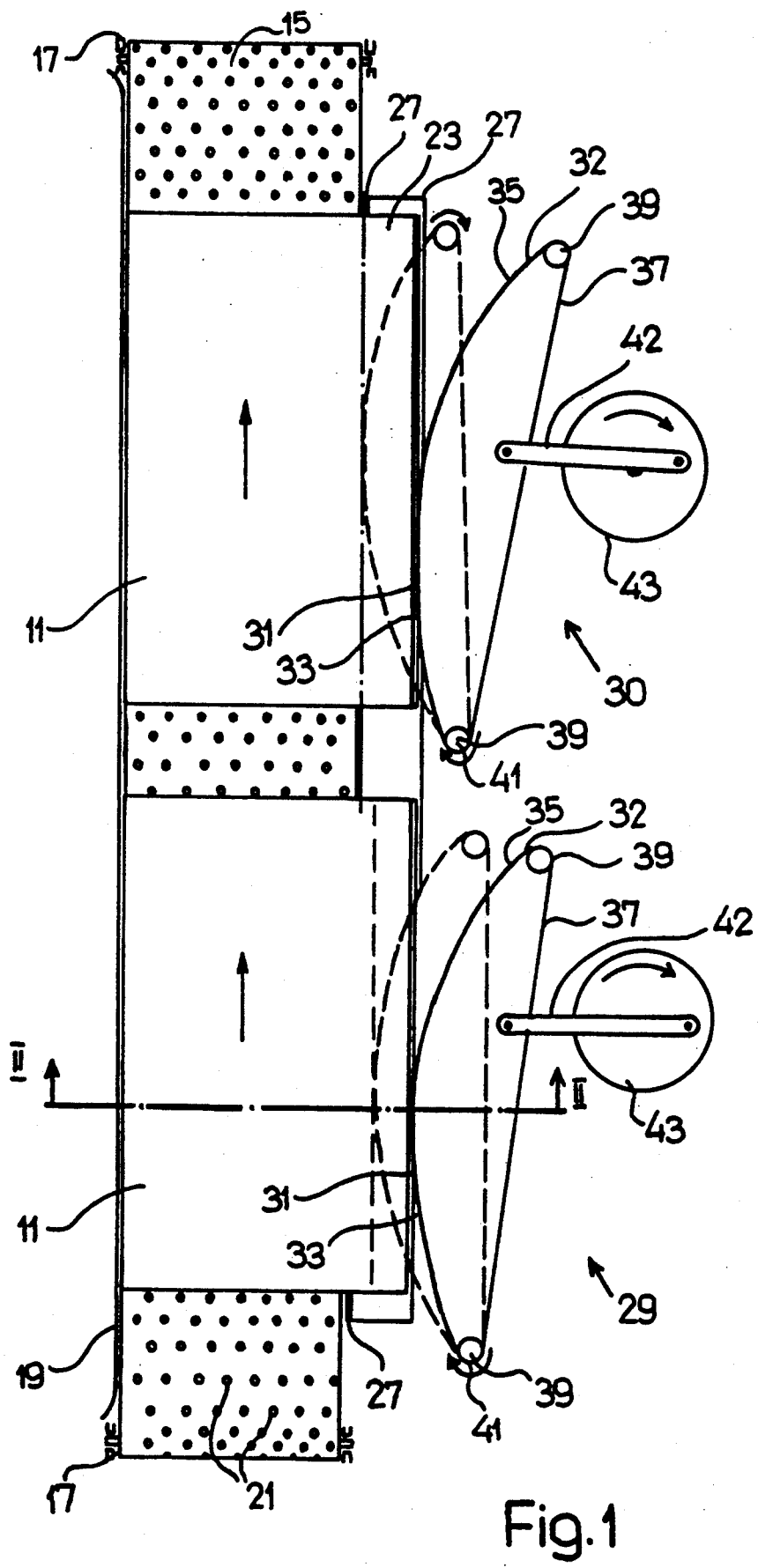
Figure 2:
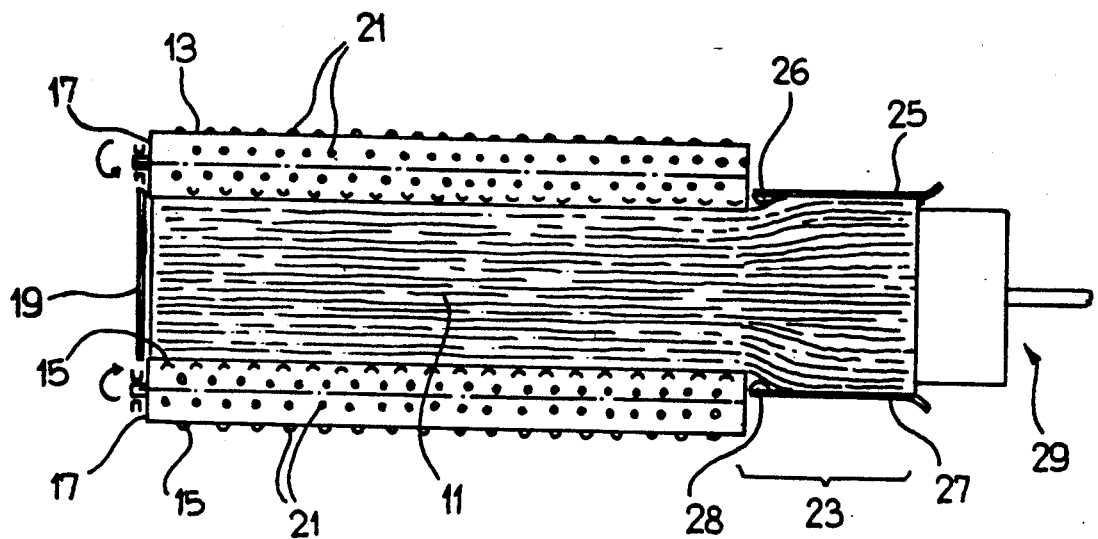

The fulling apparatus shown in FIGS. 1 and 2 has two endless studded belts 13, 15 for transport of the sheets 11; in FIG. 1, the upper studded belt has been omitted from the drawing for clarity. The studded belts 13, 15 serve not only to transport the mineral fiber sheets 11 but also to hold them firmly during fulling. To assure this, the spacing between the studded belts is set to be approximately 10% less than the thickness of the mineral fiber sheet or batt to be worked. The setting can be done by an adjusting mechanism, not shown, which enables fast conversion of the apparatus to some other sheet thickness. The drive and guidance of the endless studded belts 13, 15 is provided by a number of rollers 17. A guide baffle 19 serves to guide the sheets 11 laterally. Normally, however, the studs 21 shown in FIG. 1 are sufficient for retaining the sheets 11 when lateral forces are exerted on them during the fulling process.

In the apparatus, reference numeral 23 represents the region of the fulling zone. In the finished insulating sheet, the fulled zone is then called the compressible zone. A guide 25 and 27, respectively, is provided above and below the mineral fiber sheet 11 in the fulling zone 23. This prevents sagging of the material of the fulling zone during fulling. The beads 26, 28 make it possible to form a constriction, which prevents material of the sheet from being pressed against the edges of the endless studded belts 13, 15.

The apparatus shown is provided for fulling in two steps; in the first step, pre-fulling to a depth of about 8 cm is effected, and in the second step, fulling is done to a depth of about 11 cm. The fulling apparatus therefore has two fulling tools 29, 30, which are, suitably, identical, except that the stroke of the fulling tool 29 is set to approximately 8 cm, while the stroke of the tool 30 is set to approximately 11 cm. The fulling tools 29, 30 are disposed such that they execute back-and-forth motions in order to full the peripheral region 23 of the mineral fiber sheet 11 from the side. The fulling tools 29, 30 have an approximately cylindrically curved surface 31. The initial segment 33 of this surface 31 extends over approximately two-thirds of the tool and advantageously has a radius of approximately 125 cm. The end segment 35, which extends over approximately one-third the length of the tool, advantageously has a radius of approximately 60 cm. In the version shown, the plunger 32 of the fulling tool is provided with an endless belt 37, which extends over the curved surface 31 and is moved at practically twice the speed of the mineral fiber sheet 11. In the contact region, the orientation direction of the belt 37 is practically the same as that of the mineral fiber sheet 11. The belt 37 travels over deflection rollers 39, which are disposed at both ends of the curved surface 31 of the plunger. In the region of the leading deflection roller 39, the plunger 32 has a pivot shaft 41. This may be the same shaft that is also used for the leading deflection roller 39. Arm 42 of a crank drive mechanism 43 is pivotably connected at a distance from the pivot shaft 41 and serves to effect a number of back-and-forth motions of the plunger during the passage of a sheet 11.

During operation of the fulling apparatus, mineral fiber sheets 11 are delivered to it in succession. The mineral fiber sheets 11 are engaged by the studded belts 13, 15 and firmly retained during their passage through the apparatus. In the first fulling phase, the peripheral region 23 of the mineral fiber sheet 11 is pre-fulled to a depth of approximately 6 to 8 cm by means of approximately 20 to 25 strokes. In the second fulling phase, fulling to a depth of approximately 11 cm is effected by means of approximately 18 to 22 strokes. In general, the number of strokes per running meter of the sheet in the first phase should be approximately 20% higher than in the second phase. The guides 25, 27 prevent sagging during the fulling. Because of the large radius of the plungers and of the belt 37 traveling with them, fulling is effected gently, without damaging the edge of the sheet.

The fulling depth and the number of strokes of the fulling tools can be adjusted from one product to another, to obtain the desired compression force. The force needed for adapting a sheet one meter in length and 56 cm in width to the narrowest rafter spacing of approximately 50 to 51 cm should be approximately 18 to 25 kg, depending on the thickness of the sheet.

The fulling apparatus described is suitable for fulling not only mineral fiber sheets or plates, but also mineral fiber batts.

Figure 3:
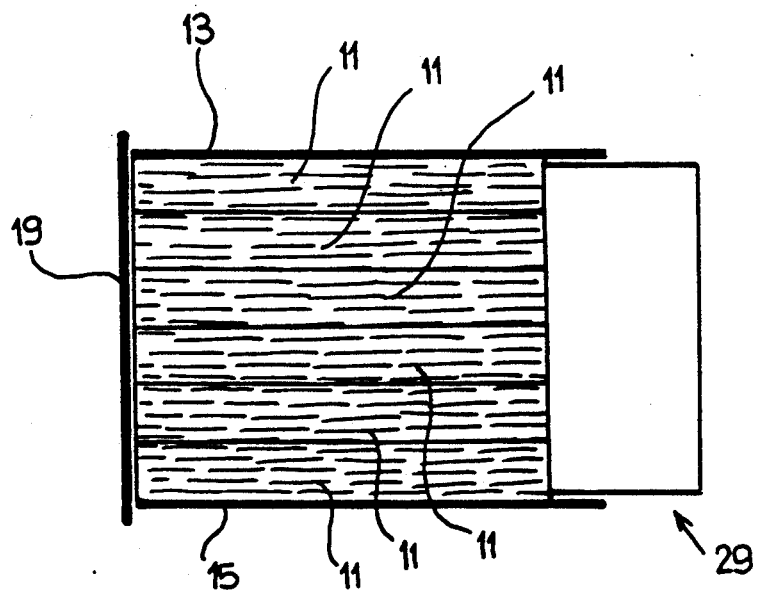

Various modifications of the method and apparatus are possible without departing from the scope of the invention. For instance, instead of the arrangement shown in FIG. 2, a plurality of mineral fiber sheets or batts can also be fulled simultaneously. FIG. 3, for instance, thus shows the simultaneous fulling of six mineral fiber sheets 11. With the apparatus schematically shown in FIG. 3, however, it would also be possible to work only one layer instead of a plurality of layers.

In the fulling apparatus of FIG. 3, conveyor belts 13, 15 and a guide baffle 19 are also provided. However, instead of conveyor belts 13, 15, pallets may also be provided. Reference numeral 29 indicates the fulling tool schematically. However, a plurality of fulling tools may also be provided, in order to perform the fulling in more than one operation. With respect to the possible embodiment of the fulling tools, reference is made to the above more-detailed description.

In the exemplary embodiment of FIG. 3, the endless conveyor belts 13, 15 that support the mineral fiber sheets 11 or batts extend over the entire width of the mineral fiber sheets or batts, in other words including the fulling zone. The fulling tool 29 may move between the conveyor belts 13, 15. Advantageously, the mineral fiber sheets or batts are compressed in thickness somewhat prior to the fulling, for instance by approximately 10% of the thickness, as has already been described in greater detail in the description of FIGS. 1 and 2.

We claim:

1. A method for producing a compressible zone (23) in at least one peripheral region of a mineral fiber sheet (11) or batt for insulation against heat, sound or fire, in which the individual fibers are joined together with a binder to make a fibrous composite structure, in which method the fibrous composite structure is partially loosened by mechanical action in a fulling zone (23) in order to form the compressible zone (23),
    wherein the method of forming the compressible zone (23) comprises the steps of
    supporting and compressing the sheet (11) or batt with respect to its thickness transversely to the major plane thereof on the bottom and top thereof, at least in a region not belonging to said zone;
    fulling the peripheral region from the side; and
    guiding material in the compressible zone to prevent sagging of the material of the fulling zone (23) out of the plane of the sheet or batt by guide means (25, 27), which are disposed in the region of the fulling zone above and below the mineral fiber sheet (11) or batt.

2. The method of claim 1, wherein the compression step comprises compressing the mineral fiber sheet or batt in thickness by approximately 10% of this thickness.

3. The method of claim 1, wherein the formation of the compressible zone (23) is effected in a plurality of steps.

4. The method of claim 1, wherein the fulling is effected by the multiple strokes of a fulling tool (29, 30) during the passage of the mineral fiber sheet (11) or batt.

5. The method of claim 4, wherein the number of strokes per running meter of the shoot or batt is adjusted in accordance with the necessary installation force.

6. The method of claim 3, wherein in a first step, fulling is effected with approximately 20% more strokes per running meter of the sheet or batt than in the second step.

7. The method of claim 1, wherein the fulling is performed in a total of 40 to 45 strokes per running meter of the sheet or batt.

8. The method of claim 3, wherein in a first step, fulling is effected to a depth of about 8 cm, and that in a second step, fulling is effected to a depth of about 11 cm.

9. The method of claim 1, wherein by the step of comprising the mineral fiber sheet or batt is also compressed in thickness in the region of the fulling zone.

10. The method of claim 9, wherein the compression step comprises compressing the mineral fiber sheet or batt in thickness by approximately 10% of this thickness.

11. The method of claim 2, wherein a plurality of stacked mineral fiber sheets or batts is fulled simultaneously.

12. An apparatus for producing a compressible zone (23) in at least one peripheral region of a mineral fiber sheet (11) or batt for insulation against heat, sound or fire, in which the individual fibers are joined together with a binder to make a fibrous composite structure, comprising at least one fulling tool (29, 30) engageable against a side of the sheet (11) or butt and operative to execute back-and-forth motion thereagainst;

means (15) for generating a relative motion between the fiber sheet (11) or batt and the fulling tool (29, 30), said apparatus further comprising support means (13, 15) for compressing and supporting the mineral fiber sheet (11) or batt at the bottom and top in the region not belonging to the fulling zone (23);

operating means (42, 43) coupled to the fulling tool (29, 30) and controlling said tool to execute said back-and-forth motions to full the peripheral region of the mineral fiber sheet (11) or batt from the side; and a guide means (25, 27) disposed below and above the fulling zone, to prevent sagging of the material during fulling.

13. The apparatus of claim 12, wherein two fulling tools (29, 30) are provided located longitudinally adjacent the sheet or batt, a first fulling tool (29) performing pre-fulling and a second fulling tool (30) performing final full-depth fulling.

14. The apparatus of claim 12, wherein the guide means (25, 27) comprises a bead (26, 28) facing the sheet (11) or batt which extends along the edge adjacent to the support means (13, 15).

15. The apparatus of claim 12, wherein the motion generating means include endless studded belts (15) for transporting the mineral fiber sheet (11), said belts forming, at least in part, also the support means for supporting the region of the mineral fiber sheet (11) or batt not belonging to the fulling zone (23).

16. The apparatus of claim 12, wherein each fulling tool (29, 30) has a plunger (32) and wherein the plunger has an approximately cylindrically curved surface (31).

17. The apparatus of claim 16, further comprising an endless belt (37) extending over the cylindrically curved surface (31) of the plunger (13), said belt being moved at essentially twice the speed of the mineral fiber sheet (11) or batt and in the same direction as the sheet or batt.

18. The apparatus of claim 17, further comprising a deflection roller (39) for the endless belt (37) on each end of the curved surface (31) of the plunger (32).

19. The apparatus of claim 18, wherein the plunger (32), in the region of one deflection roller (39), has a pivot shaft (41) about which it can be pivoted, and that the operating means comprises an arm (42) of a crank drive mechanism pivotably connected to the plunger at a pivot which is spaced apart from the pivot shaft, in order to pivot the plunger (32) back and forth.

20. The apparatus of claim 12, wherein the support means (13, 15) which support the mineral fiber sheet (11) or batt at the bottom and top also extend over the fulling zone.

21. The apparatus of claim 12, wherein the support means comprises plates or endless conveyor belts.

22. The apparatus of claim 20, wherein the support means comprises plates or endless conveyor belts.

23. A mineral fiber sheet or batt
made by the method of claim 1
and having at least one defined peripheral zone in which the fibrous composite structure is partially loosened, and wherein the region of the region of the sheet or batt not forming part of said zone has been pre-compressed.

* * * * *